United States Patent [19]

Barbour

[11] Patent Number: 4,855,820
[45] Date of Patent: Aug. 8, 1989

[54] DOWN HOLE VIDEO TOOL APPARATUS AND METHOD FOR VISUAL WELL BORE RECORDING

[76] Inventor: Joel Barbour, 3960 Germain St., Camarillo, Calif. 93010

[21] Appl. No.: 104,881

[22] Filed: Oct. 5, 1987

[51] Int. Cl.$^4$ .................. H04N 7/18; H04N 7/10
[52] U.S. Cl. ...................... 358/100; 358/99; 358/107; 358/86; 367/25; 367/69
[58] Field of Search .............. 358/100, 101, 107, 99, 358/86; 33/324, 348, 363 R; 364/422; 73/601, 623; 367/25, 35, 69, 71, 76, 86; 346/33 WC

[56] References Cited

U.S. PATENT DOCUMENTS

| | | | |
|---|---|---|---|
| 2,250,703 | 7/1941 | Crites et al. | 328/346 |
| 2,686,039 | 8/1954 | Bender | 255/1.8 |
| 2,768,684 | 10/1956 | Castel et al. | 164/5 |
| 2,817,808 | 12/1957 | Gieske | 324/34 |
| 3,974,330 | 8/1976 | Askowith et al. | 358/100 |
| 3,980,881 | 9/1976 | Veach et al. | 367/25 |
| 3,984,627 | 10/1976 | Galerne | 358/100 |
| 4,084,184 | 4/1978 | Crain | 358/93 |
| 4,227,405 | 10/1980 | West | 367/81 |
| 4,268,858 | 5/1981 | Wood | 350/99 |
| 4,350,979 | 9/1982 | Eberwein | 364/422 |
| 4,365,197 | 12/1982 | Pyatt et al. | 324/221 |
| 4,456,983 | 6/1984 | Schoonover | 367/69 |
| 4,463,378 | 7/1984 | Rambow | 358/100 |
| 4,504,857 | 3/1985 | Miller et al. | 358/100 |

OTHER PUBLICATIONS

Moore et al., "Development of a New Borehole Acoustic Televiewer for Geothermal Applications", Geothermal Resources Council, Transactions, vol. 9-Part II, Aug. 1985, pp. 471-473.

Primary Examiner—Howard W. Britton
Assistant Examiner—John K. Peng
Attorney, Agent, or Firm—Jessup, Beecher & Slehofer

[57] ABSTRACT

An apparatus and method of visually examining the sidewalls of a bore hole include a down hole video tool lowered into the bore hole by means of a cable and winch on the surface. The apparatus includes a wide angle video camera at its lower section. An upper section houses a power supply/triplexer, a telemetry board, an FM modulator video amplifier transmission board, gyroscope data interface board, and a gyroscope for showing the directional orientation of the camera and apparatus in the bore hole. The gyroscope orientation and the visual image of the portion of the sidewall viewed is transmitted to a video display monitor in an equipment van on the surface. The image on the screen includes a directional reference point so that the direction of a portion of the sidewall being viewed can be ascertained. The camera images are recorded by a video cassette recorder for a permanent record of the visualization of the entire length of the bore hole. Various geological data can be extrapolated by this visualization by means of the observed fracturing and stratification which may be observed in a given bore hole. Additionally, the probe can be used to inspect bore holes previously encased by steel tubing to detect any leaks or other deterioration in the tubing system.

28 Claims, 3 Drawing Sheets

DOWN HOLE VIDEO TOOL APPARATUS AND METHOD FOR VISUAL WELL BORE RECORDING

BACKGROUND OF THE INVENTION

1. Field of the Invention

The present invention pertains to visual bore hole logging. The visual examination of the bore hole for casing damage and/or fracturing and sediment stratification may be made with a video camera lowered throughout the bore hole and a video monitor in conjunction with a video cassette recorder for visualizing and recording the wall of the bore hole.

2. Description of the Prior Art

A well or bore hole is an artificial excavation made to extract water, oil, gas, and other substances from the earth. There is also the boring and drilling of holes for exploraton. Exploration holes are drilled to locate mineral deposits such as oil and gas, ground water, geothermal supplies, to check for the integrity for nuclear waste depositories, and also to deterine potential landslides in an unstable environment. Close circuit TV camera systems are known in the art for visually examining the walls to a given bore hole. Additionally, in large diameter bore holes, a trained geologist can be physically lowered into the hole with a light source to visually examine the stratification, fracturing and layering of the various geological formations down to which the bore hole penetrates. In small diameter holes, this type examination is impossible. Accordingly, in smaller holes visual wall examination must be made with a moving picture bore hole camera or with a closed circuit television video camera.

Additionally, the bore shaft itself made by the bore hole is often not in a vertical orientation and has a drift or deviation in azimuth from its true vertical. There are drift recorders which monitor and log the slanting or drifting of the bore hole from its true azimuth. Inclinometers are known which determine deviation as well as drift, for exmaple, by phographing from a plumb bob position against a compass background.

Additionally, while in the process of drilling a well and/or installing the steel tubing or casing to reinforce the wall of the bore hole, occasionally because of cave-ins, sedimentation and the like, the equipment in the hole becomes lodged and stuck therein. It then becomes a matter of locating the stuck pipe or other equipment in the wells, U.S. Pat. No. 2,817,808 to Giske, describes a method and apparatus for locating stuck pipe in wells.

After the steel casing or tubing has been in place for sometime in a well such as a ground water well, rusting and other shifts in the earth occasionally will cause rupturing or uncoupling of the steel casing. In this event, visual examination of the casing is necessary to see the extent of the break or leak and the feasibility of repairs.

Accordingly, the visual examination of the walls of a well are frequently needed when applied to the above problems. cl SUMMARY AND OPERATION OF THE INVENTION An apparatus and method of visually examining the sidewalls of a bore hole include a down hole video tool lowered into the bore hole by means of a cable and winch on the surface. The apparatus includes a wide angle video camera enclosed in its lower section. An upper section houses a power supply/triplexer, a telemetry board, an FM modulator video amplifier transmission board, gyro data interface board and a gyroscope for showing the directional orientation of the camera and apparatus in the bore hole. The gyroscope orientation and the visual image of the portion of the sidewall viewed is transmitted to a video display monitor in an equipment van on the surface. The image on the screen includes a directional reference point so that the direction of a portion of the sidewall being viewed can be ascertained. The camera images are recorded by a video cassette recorder for a permanent record of the visualization of the entire length of the bore hole. Various geological data can be extrapolated by this visualization by means of the observed fracturing and stratification which may be observed in a given bore hole. Additionally, the probe can be used to inspect bore holes previously encased by steel tubing to detect any leaks or other deterioration in the tubing system.

The present invention consists of a down hole video tool which includes an elongate, two-section cylindrical housing which is lowered into the bore hole. The lower end of the tool holds a video camera, a wide angle video camera lens and a light source extending a few feet in front of the lens or around the lens to illuminate the dark interior of the bore hole. There is supportive equipment above ground which includes a winch having a cable attached to the upper end of the tool to lower and retrieve the tool in the well bore. The cable includes a bidirectional data transmitting cable and also an electric cable for providing a power supply to the tool itself. Typically, the winch is installed in a large equipment van used to transport the down hole video tool. Inside the van is a variety of support equipment including a television video monitor, a video cassette recorder, a video printer, telemetry equipment and a computer. A depth measuring device to indicate the position of the tool in the ground, and a temperature sensor to measure the ambient temperature at the location of the tool are also part of the equipment.

The down hole video tool has a pressure resistant housing which houses a video camera, a light source, bidirectional telemetry circuit board for handling and processing the signals for transmittal up to the television/video monitor above ground, video amplification means of the signals, a power supply/triplexer, and a gyro and/or inclinometer.

As the down hole video tool is lowered into the bore hole, it is impossible to keep the camera and tool oriented in one direction. There will always be a twisting or rotational effect by the down hole video tool as it twists on the supporting cable to some extent. As a result, the operator does not know the direction of a side of the wall being visualized on the video monitor by means of the images telemetered from the video camera in the hole. He is unable to tell the orientation or directional bearing of the camera in the hole, i.e., the operator cannot determine the north, south, east or west side of the bore hole displayed on the video monitor.

The present invention incorporates a built-in free gyroscope in the housing which is about one and one-half inches in diameter and is arbitrarily selected to point north and then is "locked in" to always point north. The probe and camera (down hole video tool) can rotate on the cable but the spin axis of the gyro remains fixed in space. A reference point generated by the free gyro is displayed on the video screen to always indicate the directional orientation of the sides of the wall of the hole. The visual display on the video monitor screen will probably show the directional reference point drifting or floating around on the screen as the video camera in the housing rotates back and forth in the bore hole. The camera is stationary in the tool. Directional orientation of the camera is indicated by the signal generated by the built-in gyro. The gyro generates a real time image dot displayed on the video screen above ground. The image dot is self correcting to constantly show target heading of the camera, for directional reference of fractures, bed dip, casing damage or other objects being viewed.

Video logs for the bore hole video examination are visually recorded on three-quarter inch video cassettes for a permanent record. These may then be copied onto VHF, Beta, or other formats for convenience. Also available in the equipment van are hard copies of video images produced by a video printer for immediate presentation, and a video typewriter for recorded commentary. The commentary is recorded on the videotape. The orientation has applications to show hard rock fracture sizing and orientation. For example, the layer of the fracturing can be visually observed and measured by the image on the video screen. If the fracture is inclined, then the angle of inclination can also be extrapolated by a standard trigonometric function by knowing the diameter of the bore, and the difference in height between the top of the fracture at one side of the bore hole and the top of the fracture at the opposite side of the bore hole. The difference in height would form the vertical leg of a right triangle and the diameter would be the horizontal leg of the right triangle. These two numbers could be used to calculate the tangent to find the angle of inclination of the fracture at that particular depth. The reference point showing the true north on the video display monitor would also show the direction of the slope of the fracture line, or bed dip.

The above ground winch which lowers the cable into the well bore hole has an optical encoder and a calibrated wheel on the winch. This measuring equipment displays on the video monitor the depth of the probe within a tenth of a foot. For example, in an average 8 inch diameter hole, the difference in height in the top of the fracture on opposite sides of the hole is three to eight inches. This can easily be determined by looking at the depth reading presented on the video screen at the top of the fracture while the tool is being lowered to the top of the fracture on the other side of the hole and noting or reading the difference in the depth, usually in inches, as shown on the visual display. The acetate overlay showing the compass readings can be overlaid on the screen by placing the center of the graphic compass with the depth reading dot and aligning the north direction point on the screen with the North arrow of the graphic compass and then determining the sloping direction of the fracture and the bed depth. The sloping direction requires two compass readings; one at the top of the fracture having the shallower depth, and the other at the top of the same fracture having the deeper depth.

One could drill an array of exploration bore holes in a given surface area and then map the fractures and stratifications of the underground formations to determine the geological makeup of that given area. In the event where the bore holes are slightly inclined, then the readings from a previously inserted inclinometer could be used as a factor to determine the true angle of inclination of the layers. Or an inclinometer could be used by attaching it to the tool so that all readings could be taken simultaneously.

Accordingly, it is an object of this invention to have a down hole video tool for passing through the length of a drilled bore hole, and having a video camera for visually observing the walls of the bore hole, and in conjunction with a gyroscope in the tool so that the orientation of the camera lens will be known when the data is telemetered up to the video screen monitor in the equipment van so that one will be able to have a directional reference point on the video monitor screen to known the directional orientation shown of the bore hole walls when viewed on the video monitor. The directional reference point provides further data so that one can observe and calculate the rising or dropping angle of any fragmentation of layered rock in the bore hole. The directional indicator also informs one of the direction of leakage in a cased bore hole.

In is an additional object of this invention to provide a video camera and wide angled camera lens attached to the lower end of a down hole video tool and having a light source attached adjacent to the video camera so that the wall of the bore hole can be visually observed and recorded on video tape by means of transmitting the image received by the camera lens and visually displaying it on a video screen while simultaneously recording the visualization of the walls of the bore hole. The video screen also displays data such as the temperature gradient at the video camera and also the depth at the camera so that one can match the visualizations and the layering found in the bore hole with the depth of the camera lens at a particular location.

It is a further object of this invention to provide a down hole video tool having two sections and which is lowered into the bore hole. The tool includes a video camera with wide angle lens in a cylindrical housing forming the lower head section, and an upper section including a cylindrical housing for a power supply/triplexer to power the components, a free gyroscope to indicate the designated reference point of the camera lens, a means for video transmission of the data up to the video display monitor and a telemetry board for handling all of the data inputs and power sources to bidirectionally transmit the data to the surface. These are part of the second section of the tool.

DETAILED DESCRIPTION OF THE PREFERRED EMBODIMENT

Figure 1:
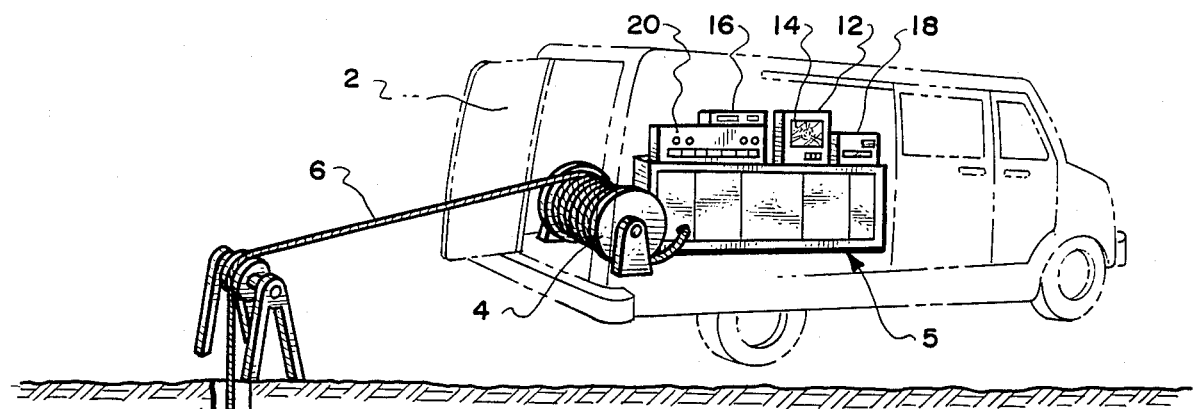
FIG. 1 shows the schematic figure of the equipment van stationed above ground and feeding the down hole video tool into the bore hole by means of a winch. The bore hole is schematically shown in cross-section with the layering effects which would commonly be found to indicate the stratification of the subsurface area to be examined.

Referring now to FIG. 1, there is disclosed in phantom lines the equipment van 2 which is used to store and transport the equipment to the job site. The van equipment includes a winch 4 which has a cable 6 attached to the down hole video tool 8 which is shown inside the bore hole 10. The bore hole to be visually monitored can be any hole previously excavated or drilled. The instrumentation inside the equipment van includes a video monitor 12 having a rectangular display screen 14, a video cassette recorder 16, a video printer 18 and a telemetry key board video typewriter 20. The cable 4 and cable head 3 serve several purposes: for example, (1) to raise and lower the video tool 8; and (2) to connect the tool 8 with the instrument panel 5 to bidirectionally relay the video transmissions by means of a coaxial cable and (3) to provide a cable to supply electricity to the tool. The down hole video tool generally has two sections, a first housing and a second housing. The upper section 30 the second housing houses the gyroscope 32, the gyroscope data interface 34, the power supply/triplexer board 36, the telemetry board 38, and the FM modulation amplifier video transmission board 40. The lower section 50, the first housing, houses the video camera 52, the light source 60 and various connecting cables 48.

The primary power supply is designed to accept side ranging incoming DC voltage anywhere from 40 to 150 volts. It takes the incoming variable DC to the tool light source. The lamp is capable of receiving 40 to 150 volts. There are also several regulated DC voltages to run the camera; perhaps 20 volts to the camera. The DC voltages also run the gyro, the camera, VC handling, telemetry coordination and the plotting to the gyro. The camera itself has a reliable bidirectional telemetry system. It is a microprocessor controlled system.

Attached to the head of the tool where the video camera is located is a light source 60 which shines and illuminates the sidewalls so that the video camera can pick up the light reflections from the sidewall as it is being passed through the bore hole. The light source, if desired, could be circular and concentric with the camera lens. The images picked up by the video camera are processed and fed through the electrical components inside the housing of the tool. The signal is passed to the surface by a conductor coaxial cable which carries video and sub-carrier frequencies bidirectionally. It is also called a coaxial data transmission line. The electronic components in the second housing 32 process and transmit bidirectionally a variety of electronic data.

Figure 2:
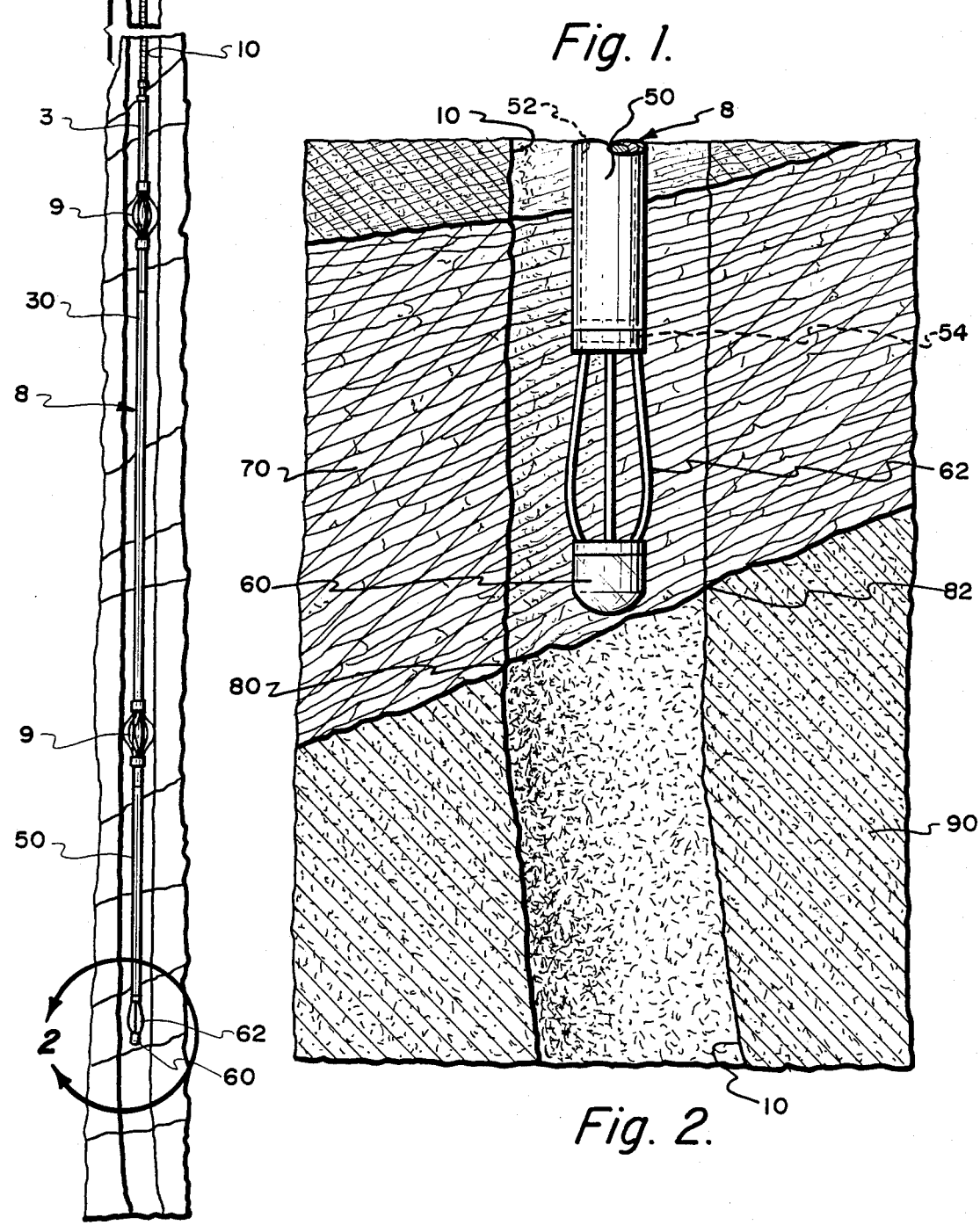
FIG. 2 is an enlarged fragmentary vertical cross section of the subsurface as shown in FIG. 1 wherein the light source is shown ahead of the wide angle video camera lens and in turn, the wall of the bore is being visually examined by means of viewing it on the display screen of the monitor in the equipment van. The video camera picks up the light reflections and transmits them via coaxial cable for display on the video screen monitor.
Figure 3:
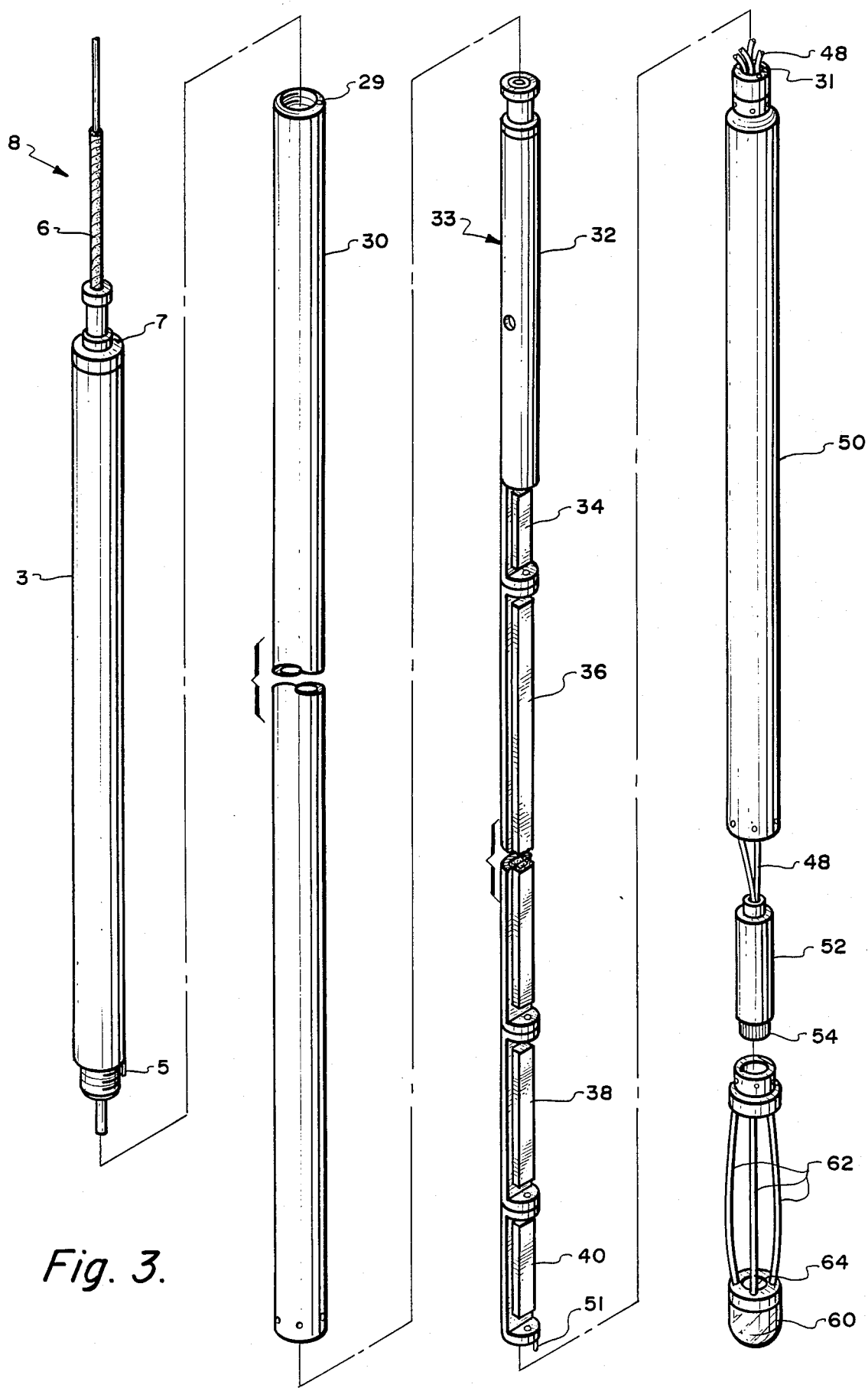
FIG. 3 shows the video tool in various stages of dismantlement. The upper section which is attached to the cable head is the housing which houses the gyroscope, gyro-data interface, power supply/triplexer, telemetry board, and video amplifier transmission board. The wide angle video camera is in the lower section of the housing with the light source in a caged environment attached adjacent to the camera lens.
Figure 4:
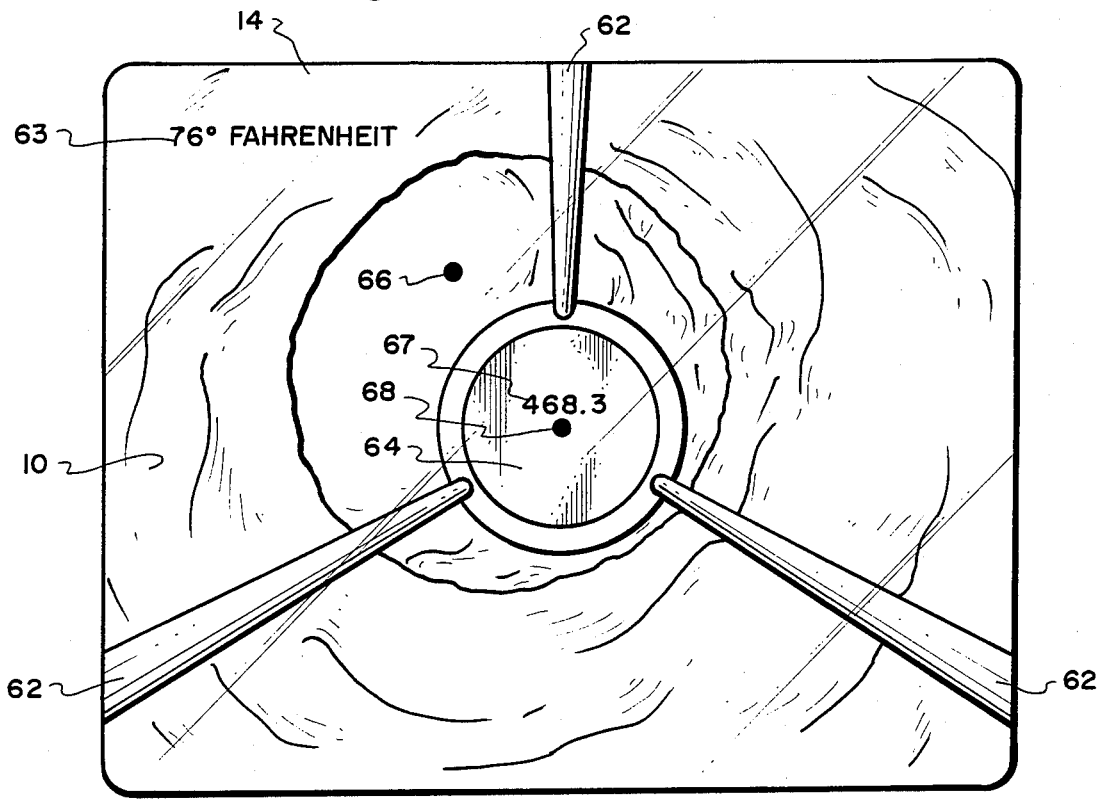
FIG. 4 illustrates a typical example of what is seen on the video screen of the monitor in the equipment van. There is shown visually the horizontal section of the wall of the bore hole at a particular location, the temperature at that particular location and the depth of the tool at that particular location. There is also shown the "floating" directional reference point showing the north direction of the wall at that location.

The gyroscope directional orientation is also incorporated in the signal which is transmitted to the equipment inside the equipment van. The end result is a video display 14 as illustrated in FIG. 4. FIG. 4 shows what a typical visual display looks like in actual operation. One sees the three prongs 62 and the backside ring 64 supporting the light source 60 positioned in front of the video camera 52 and camera wide angle lens 54. The lithography of the sidewalls of the bore 10 are readily apparent because the light source reflects light off the sidewalls which in turn is picked up by the camera. The video camera shows a rectangular screen display as shown in FIG. 4 having a conventional scanning capability of approximately 270 horizontal lines on the screen. The video camera 52 remains stationary with the tool, i.e., if the entire video tool and housing rotates or twists back and forth as it is being lowered into the bore hole, then the camera will rotate a like amount. It is impossible to prevent any twisting movement of the camera in this type of operation. As a result of the twisting and turning on the cable 6, the orientation of the camera and lens 54 relative to the sidewall of the bore hole cannot be ascertained unless a directional reference point is created relative to the camera. This is accomplished by having a guilt-in gyroscope 32 inside the second housing comprising the upper section 30 of the tool so that even if the housing tool rotates by twisting on the cable, the spin axis of the gyroscope will still be aligned to a certain reference point which is usually arbitrarily selected as the true north. The north reference point can be seen in FIG. 4 as an off center dot 66. One can determine where the south side of the sidewall is by going 180 degrees from the true north reference point 66 displayed on the monitor. As the tool turns on the cable while it is being lowered in the hole, the reference point will move about or float on the video screen. However, everything is still relative to the reference point to the true north such that one can always determine the direction of a particular portion of the sidewall of the bore hole by means of the directional reference dot. The directional orientation is important in several matters especially when observing the fracturing and layering of the soils through which the bore hole is drilled. For example, FIG. 2 shows an enlarged cross sectional view of a typical layered stratigraphic formation in the subsurface area. As can be seen in FIG. 2, there are some fracturing 70 and layering 90 and they are inclined to indicate that the layering is not always horizontal but is quite often inclined or slanted as a bed or layering in the subsurface. The angle and direction of this angled fracturing or stratification can be calculated by taking data from the video screen as shown in FIG. 4. For example, the difference in the height of the fracturing can be observed on the display which reads the depth of the light source 60 in tenths of feet, and also how the orientation of the fracturing is slanted for example from north to sourth, or east to west. The difference in the height between the top 80 and 82 of a layer of opposite sides of the bore hole can be measured by taking the difference in the two depth readings on the display as the light source passes 80 and 82. The diameter of the holes and the difference in the height allows one to calculate the slope created by the hypotenuse of the right triangle to determine the inclination of that particular fault line. This can easily be calculated by using basic trigonometry or algebra to arrive at the angle of inclination or declination of that particular fault. By means of mapping vertically the series of layers and other geologic formation which are frequently encountered through a bore hole, one can create a geological profile of the type of rock formations in that particular area and at that particular hole. One can then drill an array of similar holes in that area and then by mapping the layering effects in the various holes one could arrive at a geological profile of that given area by means of visualizing the various rock and sedimentary layers and also their inclination points. This is extremely useful in oil and gas exploration where the geologists are looking for synclines and anticlines, or dome shaped underground impermeable rock formations which are generally required in order to trap any possible oil and gas deposits to that they could be drilled at the apex of the dome of the anticline.

The visualization of the bore hole is quite useful when looking for geothermal deposits in the sense that the camera can visually observe the hole itself to see the type of layered rock formations and to observe the other sought after information visually shown on the screen as shown in FIG. 4. In the upper left hand corner of the video display is displayed the degrees in Fahrenheit reading 63 where the tool is located. The tool has two built-in thermal sensors for continuous surface readout of tool and hole temperature. The pressure and temperature resistant housing comprising the tool has the ability to withstand heat up to 200 degrees Fahrenheit. However, when viewing a bore hole for potential geothermal use, the heat could damage the instrumentation in the housing and accordingly the temperature is used mainly as a safety factor to prevent damage to the video tool. As previously stated, the other set of numbers 67 shown on the video display screen indicates the depth in feet of the video tool.

FIG. 2 shows in highly exaggerated fashion a well bore 8 or a bore hole which is not truly vertical. It is nearly impossible to drill a perfectly vertical hole because of the diverse geologic formations encountered by the drill bit. Occasionally the drill hole or the bore hole is intentionally slanted in a given direction to reach a proposed source of oil and the like. However, the slanting of the bore hole can be readily determined by instruments already known in the art. A typical instrument is known as an inclinometer (not shown) which indicates and records the orientation of the tool or drill away from the vertical. In one type of inclinometer this can be done by sequentially taking photographs of a plumb bob in conjunction with a compass. In that way, the angle of inclination and the direction of the deviation of the bore hole can be extrapolated in conjunction with the video display to accurately describe the deviation from vertical and the condition of the sidewall of the bore hole at any given location. However, the depth reading 67 is a function of the amount of cable let out from the surface. The deviations from the true vertical would create a longer length of cable than the true depth because of the deviation from the true vertical. This could be factored to subtract the reading of the depth of the tool to arrive at the depth of the tool in the true vertical should that number be required.

Figure 5:
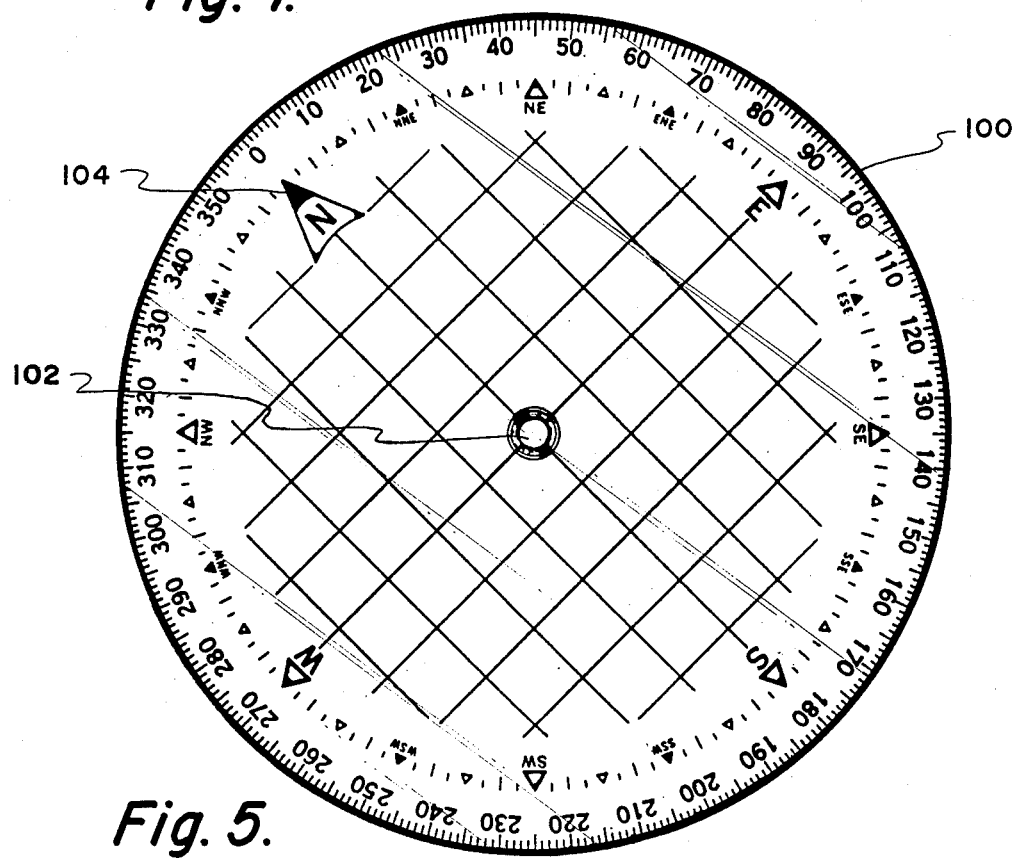
FIG. 5 is a acetate overlay which can be placed on the screen of the video monitor to find the direction of a section of the visualized wall relative to the directional reference dot shown on the video display.

FIG. 4 shows a situation where the bore hole is not truly vertical and this is evidenced by the center of the ring 64 for the light source not being in the center of the hole. This is only illustrated as an example of what is occasionally encountered in actual field conditions. One can quickly make a printed record at any given location of the tool by means of the video printer 18 connected to the video display monitor 12. Immediately, one can have a record of the bore hole at that particular location displayed on the screen 14. The master video log which is a video tape of the sidewalls along the entire length of the well bore hole examined, can be duplicated to have several copies made from the master video log for distribution to interested personnel for their evaluation and for their use of the data found by the video tool. One can take the acetate compass overlay 100 as shown in FIG. 5 and overlay it on the video display screen to quickly determine the true orientation of a particular section of the sidewall image shown on the video screen.

The center of the compass 102 (acetate overlay) is matched up with the dot 67 for the depth. The north arrow 104 is aligned with the north gyroscope dot 66 on the display 14. Now the directional bearings of the entire wall can readily be determined.

The two sections comprising the video tool; the second housing having the electronic components and gyroscope, and the camera (first) housing are coupled sections having interlocking pin 51 and hole 31 so that when they are connected together, the gyroscope will always be in the same orientation as the camera is. The cable head 3 which connects to the upper section of the tool also has an interlocking pin 5 with the upper section hole 29, so that all three parts can only be assembled or coupled in a preset configuration. When a job is initially begun, the gyroscope must be "zeroed" in to a fixed directional reference which is normally the true north. This is accomplished by having as assistant standing several hundred feet away with a survey sight line pointing to the true north and by means of a tripod or transit the true north is accurately determined. In turn, the gyroscope 32 which is caged in the housing 30 is adjusted so that its reference point 66 is set to the true north. The gyroscope in its uncaged position will always point to the true north even when the earth is rotating. It is a well known scientific principle that the axis of a free gyroscope will remain fixed with respect to space. When doing a well logging operation of a few hours the degree of offsetting of the true north from the gyroscope image on the video display is not important because of the minor change in orientation caused by the rotation of the Earth. However, where the operation takes several hours to do, the reference point 66 indicated as north on the video screen must be adjusted to compensate for the rotation of the earth. This has to be taken into consideration when the accuracy of the true north bearing is very important on a particular job.

When the tool is placed in the bore hole to be mapped or surveyed, the gyroscope 32 must first be zeroed in to the true or magnetic north. This is accomplished by performing the following sequential steps.

The gyroscope is energized for 5-10 minutes to allow it to come up to its operating speed of 40,000-50,000 RPM. The gyroscope is in a caged position, i.e., it is not free to float independently of the housing 30 in which it is contained. After the gyroscope has come up to operating speed, the down hole video tool 8 is placed in the bore hole 10. A surveyor's tripod or transit with a sight marker is placed as far away as possible, but at least 100 feet away from the bore hole and without any magnetic interferences. A sighting telescope (not shown) is demountably attached to the top of the end of the cable head 3. The telescope is sighted in with the sight marker and tripod or transit previously placed some distance away from the gyroscope. Usually, north will be the arbitrary directional reference point. However, east, west, south, or any direction could be used as a reference point if so desired. In this configuration there is a mark 7 or reference point on the outside cable head 3 indicating the north position for the gyroscope. The down hole video tool while hanging pendulant in the bore hole to be surveyed, is rotated until the north marker 7 on the outside of the housing comprising the cable head 3 aligns with the true north as sighted in with the sight marker. This can be accomplished by physically rotating the cable head which is interlocked with the attached tool so that the marker 7 aligns with the north according to the sighting with the tripod. When the mark 7 is aligned with the true north, there is a switch in the telemetry equipment 20 inside the equipment van which is switched on. This telemetry switch will uncage the gyroscope and allow it to float in a free position. The spin axis of the free gyroscope then will always point to the north direction. When the gyroscope is in the free-floating position it will always point towards north regardless of the rotation of the earth. This information is processed and displayed on the video display and the 'floating' north directional reference dot 66.

During the switching on of the telemetry machine 20 to uncage the gyroscope to the free-floating position, the time is also entered into the telemetry equipment by means of the video keyboard. After the bore hole surveying has been completed, the tool is again pulled to the surface and the true north position of the marker on the housing indicating the direction of the gyroscope is again set and again entered into the telemetry equipment. The time of the day is also entered. In a surveying operation taking an hour or so, the drift caused by the rotation of the earth is negligible. However, in a more extended surveying operation extending over 3 - 4 hours, the drift could comprise 33-4 degrees drift. This drift caused by the earth's rotation will then be entered into the telemetry and processing equipment. The reference point displayed on the screen is corrected based upon the time vs. drift parameters.

The video system enclosed in the first housing 50 is a especially designed high resolution black and white or color video system for down hole use. The tool's depth capacity is 10,000 feet with a 2.150 inch outer-diameter for black and white and a 3.5 inch outer diameter for color. The array of cables exposed at the end of the housing 50 are coaxial cables for the camera, and also a power supply cord for the camera and light source 60. These cables 48 connect with the electronic components enclosed in the second housing 32. The spacers 9 slip over the tool and center the tool in large diameter bore holes.

A flux gate north directional seeker could be substituted for the gyroscope. An inclinometer could be attached to the tool to get directional slope of the bore hole. Usually, however, the bore hole to be video logged, has already been logged with an inclinometer, and the data is used in conjunction with the video logging.

What is claimed is:

1. A method for visually examining and video recording the sidewall of a bore hole comprising the steps of:
   attaching a video camera at one end to a first housing forming a lower section of a tool;
   installing a gyroscope in a second housing which is connected at one end to said other end of said first housing forming the upper section of said tool;
   said video camera, said first housing, said second housing and said gyroscope being interconnected in a predetermined set radial alignment relative to each other along the tool's longitudinal axis;
   connecting the other end of said second housing to a cable head having a power supply cord and a coaxial transmission cable for connecting said tool to a video monitor and providing power to said tool;
   aligning said gyroscope in its free state in said second housing so that its spin axis is pointed to a given direction;
   attaching a light source adjacent to said video camera for illuminating a portion of the bore hole viewed by said video camera;
   energizing said video camera and said light source;
   lowering said cable, cable head, and first and second housing which form the down hole video tool into said bore hole by means of said cable while suspending said tool in said bore hole;
   projecting onto a video monitor the image of the illuminated sidewall along with a floating reference point, said reference point indicating the preset aligned direction of said gyroscope's spin axis thereby providing for the directional radial or circumferential reference to any portion of the sidewall shown on said video monitor and also projecting onto said monitor the depth at which said video camera is located in the bore hole;
   connecting a video recorder to said video monitor for recording in real time the images and data through a given passage of said tool as it is lowered or raised in the bore hole.

2. The procedure as described in claim 1 further comprising connecting a video printer to said monitor for printing a selected visual sighting on said video screen for a particular location in the bore hole.

3. The procedure as recited in claim 1 further comprising the steps of taking measurements of said sidewalls and inputting the data into equipment above ground for determining the orientation of a geological bed layer according to the following steps:
   determining the offset of the layer by measuring the difference in height at opposite sides of the sidewall between the top edges of the layer and inputting the data to said equipment above ground;
   measuring the diameter of the bore hole and inputting said data to said equipment above ground;
   reading the angle of inclination of the bed layer by means of the trigonometric function formed by the diameter divided by the difference in height calculated by said equipment above ground;
   reading the directional slant of the bed layer by observing the direction of the dip on the video monitor relative to the gyroscope directional reference point displayed on the screen;
   reading the results obtained by said input of data in said equipment above ground.

4. The procedure as recited in claim 1 further comprising the steps of inspecting an encased bore hole for damage by lowering said down hole video tool into said bore hole while its passage on said video screen is being observed on said video screen and recording on said VCR;
   locating the break in the casing and determining the directional orientation of the casing break relative to the directional reference point indicated by said gyroscope on said video screen;
   recording the depth shown on said video screen.

5. A down hole video tool comprising:
a first housing containing a video camera at one end for generating and transmitting video signals;
a second housing attached at one end to an end of said first housing opposite the end of said camera end;
said second housing comprising:
  a power supply/triplexer;
  a gyroscope for generating directional orientation data;
  a telemetry board;
  a gyroscope data interface board;
  an FM modulator video amplifier transmission board;
  a light source attached to the head where said video camera is enclosed for illuminating the sidewalls of a bore hole to allow said video camera to pick up and transmit signals to a receiving means above ground; said video camera, said first housing, said second housing and said gyroscope being interconnected in a predetermined set radial alignment relative to each other along the tool's longitudinal axis;
said video transmission signals from said video camera being processed by said telemetry board in combination with said gyroscope directional orientation data for transmitting a signal to a video monitor above ground;
said signal displayed on said video monitor including a radial or circumferential directional reference point of said image displayed on said monitor while showing a given section of said sidewall where said video camera is located at that particular depth.

6. The apparatus as recited in claim 5 including video data transmission line means for transmitting the video data to the equipment above ground.

7. The apparatus as recited in claim 5 further comprising a spacer means slipped over said down hole video tool for centering said tool in a well or a bore hole having a diameter larger than the diameter of said down hole video tool.

8. The apparatus as recited in claim 5 further comprising an inclinometer attached to said tool.

9. The apparatus as recited in claim 5 wherein said receiving means above ground includes a video screen monitor and data processing equipment.

10. A down hole video tool comprising:
a first housing containing a video camera at one end for generating and transmitting video signals;
a second housing attached at one end to an end of said first housing opposite the end of said camera end;
said second housing comprising:
  a power supply/triplexer;
  a flux gate north seeker for generating directional orientation data;
  a telemetry board;
  a flux gate north seeker data interface board;
  an FM modulator video amplifier transmission board;
  a light source attached at the head where said video camera is enclosed for illuminating the sidewalls of a bore hole to allow said video camera to pick up and transmit signals to a receiving means above ground;
said video camera, said first housing, said second housing and said flux gate north seeker being interconnected in a predetermined set radial alignment relative to each other along the tool's longitudinal axis;
said video transmission signals from said video camera being processed by said telemetry board in combination with said flux gate north seeker directional orientation data for transmitting a signal to a video monitor above ground;
said signal displayed on said video monitor including a radial directional reference point of said image displayed on said monitor while showing a given section of said sidewall where said video camera is located at that particular depth.

11. The apparatus as recited in claim 10 including video data transmission line means for transmitting the video data to the equipment above ground.

12. The apparatus as recited in claim 10 further comprising a spacer means slipped over said down hole video tool for centering said tool in a well or a bore hole having a diameter larger than the diameter of said down hole video tool.

13. The apparatus as recited in claim 10 further comprising an inclinometer attached to said tool.

14. The apparatus as recited in claim 10 wherein said receiving means above ground includes a video screen monitor and data processing equipment.

15. A method for visually examining and video recording the sidewall of a bore hole comprising the steps of:
  installing a video camera on a housing means which forms the housing for the tool;
  installing a gyroscope on said housing means forming said tool;
  said video camera and said gyroscope being interconnected in a predetermined set radial alignment relative to each other along said tool's longitudinal axis;
  connecting said housing means to a cable head means having a power supply cord and transmission cable means for connecting said tool to a video monitor and providing power to said tool;
  aligning said gyroscope in its free state on said housing means so that its spin axis is pointed to a given direction;
  attaching a light source adjacent to said video camera for illuminating a portion of the bore hole when viewed by said video camera;
  energizing said video camera and said light source;
  lowering said cable means, cable head means, and said housing means which form said down hole video tool into the bore hole by means of said cable means while suspending said tool in the bore hole;
  projecting onto a video monitor the image of the illuminated sidewall along with a floating reference point, said reference point indicating the preset aligned direction of said gyroscope's spin axis thereby providing for the directional radial or circumferential reference of any portion of the sidewall shown on said video monitor and also projecting onto said monitor the depth at which said video camera is located in the bore hole.

16. The procedure as described in claim 15 further comprising connecting a video printer to said monitor for printing a selected visual sighting on said video screen for a particular location in the bore hole.

17. The procedure as recited in claim 15 further comprising the steps of taking measurements of the sidewalls and inputting the data into equipment above ground for determining the orientation of a geological bed layer according to the following steps:

determining the offset of the layer by measuring the difference in height at opposite sides of the sidewall between the top edges of the layer and inputting the data to said equipment above ground;

measuring the diameter of the bore hole and inputting said data to said equipment above ground;

reading the angle of inclination of the bed layer by means of the trigonometric function formed by the diameter divided by the difference in height calculated by said equipment above ground;

reading the directional slant of the bed layer by observing the direction of the dip on the video monitor relative to the gyroscope directional reference point displayed on the screen;

reading the results obtained by said input of data in said equipment above ground.

18. The procedure as recited in claim 15 further comprising the steps of inspecting an encased bore hole for damage by lowering said down hole video tool into said bore hole while its passage on said video screen is being observed on said video screen and recorded on said video cassette recorder;

locating the break in the casing and determining the directional orientation of the casing break relative to the directional reference point indicated by said gyroscope on said video screen;

recording the depth shown on said video screen.

19. A down hole video tool comprising:
housing means containing;
a video camera at or towards one end for generating and transmitting video signals;
a power supply/triplexer;
a gyroscope for generating directional orientation data;
a telemetry board;
a gyroscope data interface board;
an FM modulator video amplifier transmission board;
a light source attached adjacent to said housing means where said video camera is contained for illuminating the sidewalls of a bore hole to allow said video camera to pick up and transmit signals to a receiving means above ground;
said video camera, said housing means and said gyroscope being interconnected in a predetermined set radial alignment relative to each other along said tool's longitudinal axis;
said video transmission signals from said video camera being processed by said telemetry board in combination with said gyroscope directional orientation data for transmitting a signal to a video monitor above ground;
said signal displayed on said video monitor including a radial or circumferential directional reference point of said image displayed on said monitor while showing a given section of the sidewall where said video camera is located at that particular depth.

20. The apparatus as recited in claim 19 including video data transmission line means for transmitting the video data to the equipment above ground.

21. The apparatus as recited in claim 19 further comprising a spacer means slipped over said down hole video tool for centering said tool in a well or a bore hole having a diameter larger than the diameter of said down hole video tool.

22. The apparatus as recited in claim 19 further comprising an inclinometer attached to said tool.

23. The apparatus as recited in claim 19 wherein said receiving means above ground includes a video screen monitor and data processing equipment.

24. A down hole video tool comprising:
housing means containing;
a video camera at or towards one end for generating and transmitting video signals;
a power supply/triplexer;
a flux gate north seeker for generating directional orientation data;
a telemetry board;
a flux gate north seeker data interface board;
an FM modulator video amplifier transmission board;
a light soruce attached adjacent to said housing means where said video camera is contained for illuminating the sidewalls of a bore hole to allow said video camera to pick up and transmit signals to a receiving means above ground;
said video camera, said housing means and said flux gate north seeker being interconnected in a predetermined set radial alignment relative to each other along said tool's longitudinal axis;
said video transmission signals from said video camera being processed by said telemetry board in combination with said flux gate north seeker directional orientation data for transmitting a signal to a video monitor above ground;
said signal displayed on said video monitor including a radial or circumferential directional reference point of said image displayed on said monitor while showing a given section of the sidewall where said video camera is located at that particular depth.

25. The apparatus as recited in claim 24 including video data transmission line means for transmitting the video data to the equipment above ground.

26. The apparatus as recited in claim 24 further comprising a spacer means slipped over said down hole video tool for centering said tool in a well or a bore hole having a diameter larger than the diameter of said down hole video tool.

27. The apparatus as recited in claim 24 further comprising an inclinometer attached to said tool.

28. The apparatus as recited in claim 24 wherein said receiving means above ground includes a video screen monitor and data processing equipment.

* * * * *